(12) United States Patent
Fiechtner et al.

(10) Patent No.: US 9,533,537 B2
(45) Date of Patent: Jan. 3, 2017

(54) RUBBER BEARING CONNECTION

(71) Applicant: ZF Friedrichshafen AG, Friedrichshafen (DE)

(72) Inventors: Martin Fiechtner, Ludwigsburg (DE); Wolfgang Modinger, Weinstadt (DE); Hans-Juergen Wellensiek, Buende (DE); Arnold Middelkampf, Badbergen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/386,024

(22) PCT Filed: Mar. 15, 2013

(86) PCT No.: PCT/EP2013/055317
§ 371 (c)(1),
(2) Date: Sep. 18, 2014

(87) PCT Pub. No.: WO2013/156218
PCT Pub. Date: Oct. 24, 2013

(65) Prior Publication Data
US 2015/0042059 A1 Feb. 12, 2015

(30) Foreign Application Priority Data
Apr. 16, 2012 (DE) .................. 10 2012 206 132

(51) Int. Cl.
*B60G 7/02* (2006.01)
*B60G 7/00* (2006.01)
(Continued)

(52) U.S. Cl.
CPC .............. *B60G 7/001* (2013.01); *B60G 7/02* (2013.01); *B60G 11/22* (2013.01); *F16F 1/3842* (2013.01);
(Continued)

(58) Field of Classification Search
CPC ... B60G 7/001; B60G 7/02; B60G 2204/4102; B60G 2204/41; B60G 2204/1431; B60G 2204/143; B60G 2204/14; B60G 2200/154; B60G 2200/1424; F16F 1/3842; F16F 1/393; F16F 1/38; Y10T 403/458
(Continued)

(56) References Cited

U.S. PATENT DOCUMENTS 4,415,178 A * 11/1983 Hatsushi et al. ........ 280/124.145
4,720,120 A    1/1988 Shimatani et al.
(Continued)

FOREIGN PATENT DOCUMENTS

DE    37 08 037 A1    10/1987
DE    200 04 149 U1    6/2000
(Continued)

OTHER PUBLICATIONS

German Search Report Corresponding to 10 2012 206 132.0 mailed Nov. 21, 2012.
(Continued)

*Primary Examiner* — Keith Frisby
(74) *Attorney, Agent, or Firm* — Davis & Bujold, PLLC; Michael J. Bujold

(57) ABSTRACT

A suspension arm (1) for a vehicle including a bearing (4) and a journal (2). The bearing (4) has at least one elastic sub-element (4c) and the bearing (4) is arranged on the journal (2) of the suspension arm (1) and encloses the journal (2). The journal (2) and the bearing (4) are designed to co-operate with one another in such manner that the bearing (4), relative to the journal (2), has a transition fit. The bearing (4) is fixed on the journal (2) of the suspension arm (1) by a fastening element (3).

9 Claims, 4 Drawing Sheets

(51) Int. Cl.
  *F16F 1/38* (2006.01)
  *B60G 11/22* (2006.01)
(52) U.S. Cl.
  CPC ... *B60G 2204/14* (2013.01); *B60G 2204/1431* (2013.01); *Y10T 29/49622* (2015.01)
(58) Field of Classification Search
  USPC .... 280/124.144, 124.134, 124.177; 403/221, 403/228; 384/222
  See application file for complete search history.

(56) References Cited

U.S. PATENT DOCUMENTS

| | | | |
|---|---|---|---|
| 5,662,349 A * | 9/1997 | Hasshi et al. | 280/124.134 |
| 5,879,026 A | 3/1999 | Dostert et al. | |
| 8,388,001 B2 | 3/2013 | Mielke et al. | |
| 2006/0019790 A1* | 1/2006 | Morin et al. | 475/142 |
| 2009/0134594 A1 | 5/2009 | Kiselis et al. | |
| 2011/0248555 A1* | 10/2011 | Werries et al. | 301/109 |

FOREIGN PATENT DOCUMENTS

| | | |
|---|---|---|
| DE | 694 26 991 T2 | 10/2001 |
| DE | 101 63 555 A1 | 7/2003 |
| DE | 10 2010 031 891 A1 | 1/2012 |
| DE | 10 2011 106 643 A1 | 1/2012 |
| EP | 2 351 656 A1 | 8/2011 |
| GB | 484 874 | 5/1938 |
| GB | 2 092 965 A | 8/1982 |
| JP | H07-186652 A | 7/1995 |
| JP | 2003-294020 A | 10/2003 |

OTHER PUBLICATIONS

International Search Report Corresponding to PCT/EP2013/055317 mailed Oct. 7, 2013.
Written Opinion Corresponding to PCT/EP2013/055317 mailed Oct. 7, 2013.

* cited by examiner

RUBBER BEARING CONNECTION

This application is a National Stage completion of PCT/EP2013/055317 filed Mar. 15, 2013, which claims priority from German patent application serial no. 10 2012 206 132.0 filed Apr. 16, 2012.

FIELD OF THE INVENTION

The present invention concerns a suspension arm for a vehicle, comprising a bearing and a journal, wherein the bearing comprises at least one elastic sub-element and wherein the bearing is arranged on the journal and is formed such that it encloses the journal. In addition the present invention concerns a production method for a suspension arm of a vehicle having a bearing.

BACKGROUND OF THE INVENTION

In the manufacture of various assemblies the automobile industry values using structural elements which are as simple and inexpensive to produce as possible and which, for servicing and repair work, can be exchanged easily.

From DE 200 041 49 U1 a transversely elastic bearing arrangement for a suspension arm in a wheel suspension is known, which comprises a bearing bolt and a bearing, the bearing being in the form of a rubber bearing. This rubber bearing comprises both an outer and an inner sleeve, such that between the sleeves —at least in part—an elastomer body is provided. The bolt is pressed into the inner sleeve, this also being known as a press fit. In the case of a press fit, if the rubber bearing has to be replaced, then both the bearing itself and the bolt can easily be damaged because of the high press-on and extraction forces.

Such a connection of a journal and bearing in the manner of a press fit, known from the prior art, is explained below with reference to FIG. 1.

FIG. 1 shows a journal 22 of a suspension arm 11, which has a single step. The journal 22 has a stepped area 22a and a contact surface 22b for a bearing 44.

The bearing 44 comprises an inner sleeve 44a and an outer sleeve 44b. Between the inner sleeve 44a and the outer sleeve 44b is arranged an elastomer body 44c.

The bearing 44 is fitted onto the journal 22 by a press fit. A press fit between the two components means that in the area 22b the diameter of the journal is larger than the diameter of the inner sleeve 44a. The disadvantage of this is that in the area 22b the inner sleeve 44a of the bearing 44 and the journal 22 can be damaged during the assembly or dismantling of the bearing 44 because of the large pressing-on or extraction forces involved.

In the contact area 22b, the bearing 44 comes into contact with the journal 22. The stepped area 22a serves as a stop for the bearing 44, i.e. the bearing 44 can be pressed onto the journal 22 up to that area 22a.

Furthermore, searches by the applicant have revealed that from the prior art it is also known to connect a rubber bearing with one journal end of the suspension arm in a form-enclosing manner, and fix it additionally by means of a screw connection. The transverse and longitudinal forces are absorbed by the preferably conical shape interlock and by a screw head. On the other hand, the radial forces are transferred by friction. The bearing does not enclose the bearing element, and this impairs the stability of the connection. Moreover, severe demands are made in the connection area on the interlocking structure between the end of the suspension arm and the bearing, so that the production costs of those components are relatively high.

This is described with reference to FIG. 2.

FIG. 2 shows a journal 222 of a suspension arm 111 and a bearing 444. The journal 222 and the bearing 444 are connected to one another in the area 222a with interlock by means of a matching conical shape.

The bearing 444 comprises an inner sleeve 444a, an outer sleeve 444b, and an elastomer body 444c arranged between the inner sleeve 444a and the outer sleeve 444b.

To fix the bearing 444 on the journal 222, fastening means in the form of a screw 333 are provided.

Besides ensuring shape interlock, the screw 333 serves as a further connecting element between the journal 222 and the bearing 444. The screw head comes in contact with the bearing 444 and the screw connector is screwed into the journal 222 of the suspension arm 111.

In contrast to FIG. 1, in the prior art according to FIG. 2 the bearing 444 does not comprise the journal 222 of the suspension arm.

SUMMARY OF THE INVENTION

Thus, the purpose of the present invention is to enable a simply designed and inexpensive connection of a bearing to a bearing journal.

This objective is achieved by a suspension arm for a vehicle, comprising a bearing and a journal, wherein the bearing comprises at least one elastic sub-element and wherein the bearing is arranged on the journal of the suspension arm and is designed to enclose the journal and a production method according to the invention for a suspension arm of a vehicle.

The suspension arm according to the invention for a vehicle comprises a bearing and a journal, the bearing having at least one elastic sub-element and being designed to be arranged on the journal of the suspension arm so that it encloses the journal. The distinguishing feature of the suspension arm is that the journal and the bearing are designed to co-operate in such manner that relative to the journal the bearing has a transition fit, and the bearing is fixed to the journal by a fastening element.

In the context of this description the term "transition fit" is used in accordance with the definition which is usual in mechanical engineering, namely a borderline between a press fit and a clearance fit. Fits are determined by the difference between the size of a bore and the size of a shaft:

'Press fit' (also called 'interference fit') means that the maximum size of the bore is always smaller than, or in the limiting case equal to, the minimum size of the shaft. 'Clearance fit' means that the minimum size of the bore is always larger than, or in the limiting case equal to the largest size of the shaft. In the case of a transition fit, depending on the actual sizes of the bore and shaft, when these are joined there is either some clearance or an interference, see for example "*Fachkunde Metall*" (Metal Proficiency), *Verlag Europa-Lehrmittel*, 2003, ISBN 3-8085-1154-0. Thus, the essential requirement for the presence of a transition fit is not the actual sizes, but rather, the tolerance ranges of the components used:

In a transition fit the tolerance range of the bore size and the tolerance range of the shaft size overlap, while in contrast, for a press fit and for a clearance fit the ranges are never contingent, or show no overlap.

Examples of transition fits in accordance with the "Uniform bore" fit system are: $d_{j6}^{H7}$ or $d_{m6}^{H7}$, see ISO Standard 286(-1/-2).

Thus, the existence of a transition fit is determined by the manufacturing specifications of the components used and on a statistical analysis of a large number of manufactured components.

In the context of the object of the present invention, the journal is the shaft and the clear inside diameter of the inner sleeve of the bearing is the bore.

Compared with the transition fit chosen in this case, in DE 200 041 49 U1, mentioned as the prior art, a press fit is specified. This means that within the range of production tolerances, the outer diameter of the journal is larger than the inside diameter of the inner sleeve of the bearing.

Compared with the previously known prior art, the arrangement according to the invention makes it possible during the assembly of the suspension arm to press the bearing onto, or push it over the journal with less effort and then fix it there by fastening means. In the event of dismantling, the bearing can be pulled off easily and exchanged, without damaging the bearing or the journal.

A preferred embodiment of the suspension arm according to the invention provides that the journal is made integrally with the rest of the suspension arm. The journal, which is enclosed by the bearing, can be a first part of the suspension arm which is connected to a further part of the suspension arm. This enables the suspension arm to be designed flexibly so that it can easily be adapted to the structural space available. It is also within the scope of the invention that the journal is a separate component, which is connected to the rest of the suspension arm.

Advantageously, the journal of the suspension arm has at least one stepped area such that the bearing is pushed onto the journal as far as the step. This provides a preferably all-round axial end-stop surface by virtue of which the bearing can be positioned. The assembly of the bearing is simplified since the stop surface produced by the step facilitates defined positioning of the bearing on the suspension arm, Furthermore, the stop surface also serves to absorb the longitudinal forces that occur. Also within the scope of the invention is to make the journal with more than one step. This reduces the contact area of the bearing on the journal, so that both the bearing and the journal can be handled with care and are less severely loaded.

Preferably, the fastening means are connected detachably to the suspension arm. This enables maintenance and repair work to be carried out in a simple manner.

In a particularly preferred embodiment of the suspension arm according to the invention, the fastening element is designed to be detachable, preferably in the manner of a screw. Advantageously, it is arranged in the direction of the longitudinal axis of the journal, preferably coaxially. This means that the screw is preferably arranged detachably and is screwed into the journal along the longitudinal axis thereof. The screw serves to secure the bearing against coming loose, to fix it, and to hold it in position firmly. Furthermore, in the event of repair work, the screw enables the bearing to be replaced easily. Moreover, the screw transmits any torque acting upon the bearing to the journal.

Advantageously, the fastening element is secured against inadvertent loosening by an adhesive, which adhesive is preferably arranged in the area of the screw thread. This securing with adhesive ensures that the screw connection will not come apart inadvertently and will function as a durable and safe connection between the structural elements. The securing adhesive can be arranged in the area of the screw thread (thread clearance) of the screw. In particular, it is preferable to design the securing adhesive in a manner such that it will indeed secure the screw against inadvertent loosening, on the other hand a user can loosen the screw, if necessary using a wrench.

In a further advantageous design of the suspension arm according to the invention, a washer is provided between the screw and the bearing, in order to transmit the initial screwing force. Besides transmitting the initial screwing force to the bearing, the washer protects the bearing from damage during assembly and during the screwing process.

Another further development of the suspension arm according to the invention provides that the bearing is in the form of a rubber bearing. Advantageously, this rubber bearing consists of an inner sleeve or inner bush and an outer sleeve or outer bush, with an elastomer body between them, at least in part. The inner bush and the journal are paired in the manner of a transition fit. Both the inner and the outer sleeve are advantageously made of a metallic material, preferably aluminum. The journal is also preferably made of aluminum. However, the invention should not be deemed to be restricted to that material, as other materials can be used as well. The advantage of a rubber bearing is that there are various embodiment variants and sizes thereof, which have been well tried in the prior art. The choice of a transition fit prevents any scoring, i.e. damage of the surface of the journal and of the inner sleeve of the rubber bearing.

As already explained above, the journal can also be made with more than one step. In an advantageous further development of the suspension arm according to the invention, the journal has at least a second stepped area to reduce the contact surface between the inner bush and the journal. Compared with the previously known prior art this reduces damage, for example "scoring" of the components.

Advantageously, the suspension arm can be arranged on a front wheel axle or on a rear wheel axle. This implies that the suspension arm according to the invention can be used in various ways.

The manufacturing method for a suspension arm according to the invention of a vehicle with a bearing comprises the following process steps:

a. the bearing and the journal are each chosen from a quantity of components whose relative tolerances for the bearing and journal give a pairing in the manner of a transition fit, b. during assembly, the bearing is first pushed onto a journal of the suspension arm, preferably as far as the stepped area, c. the bearing is then fixed on the journal by the fastening means, preferably by means of a screw.

Thus, the method according to the invention enables the journal and the bearing to be securely and durably connected and when necessary, for example for repair work, for that connection to be undone without damaging the bearing. During this, compared with the previously known prior art the bearing and journal are substantially less severely stressed.

BRIEF DESCRIPTION OF THE DRAWINGS

Further advantages and characteristics of the present invention are explained below with reference to the example embodiments. The figures show.

DETAILED DESCRIPTION OF THE PREFERRED EMBODIMENTS

Figure 1:
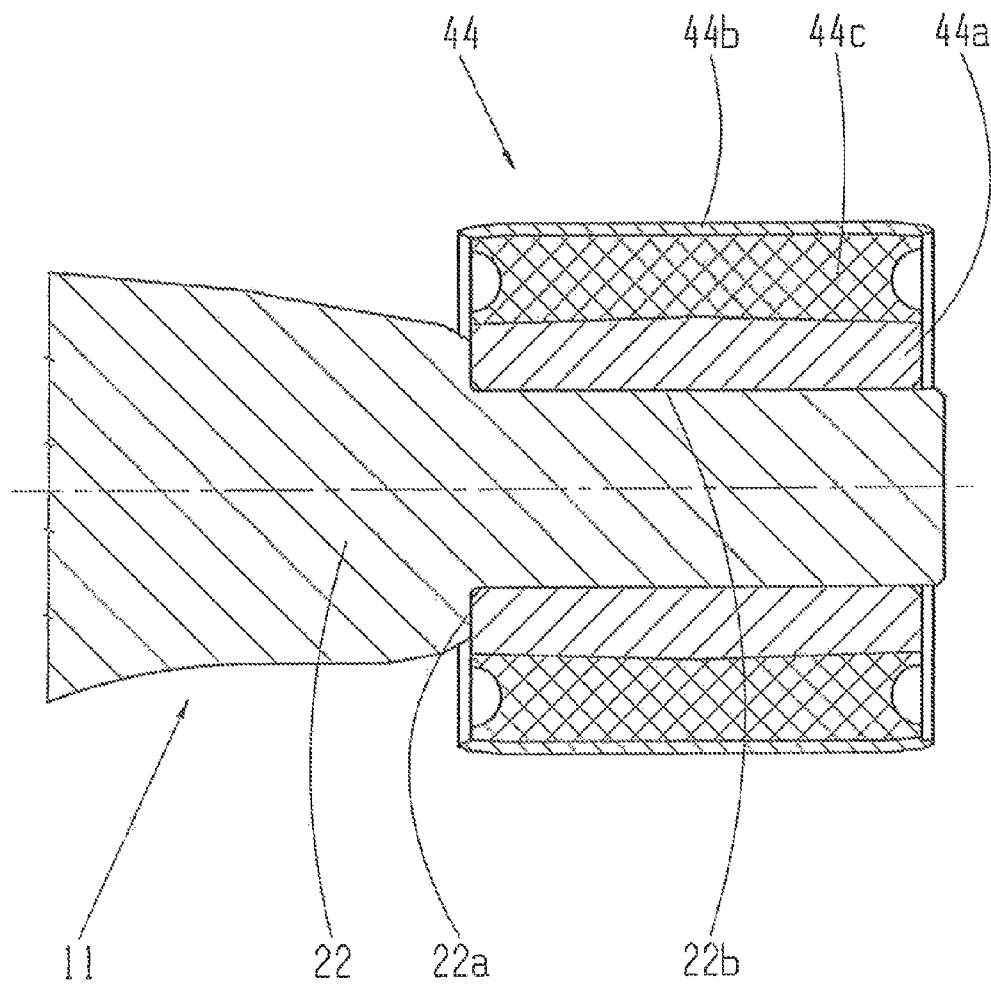
FIG. 1: The connection of a suspension arm with a journal and a bearing in the manner of a press fit according to the prior art.
Figure 2:
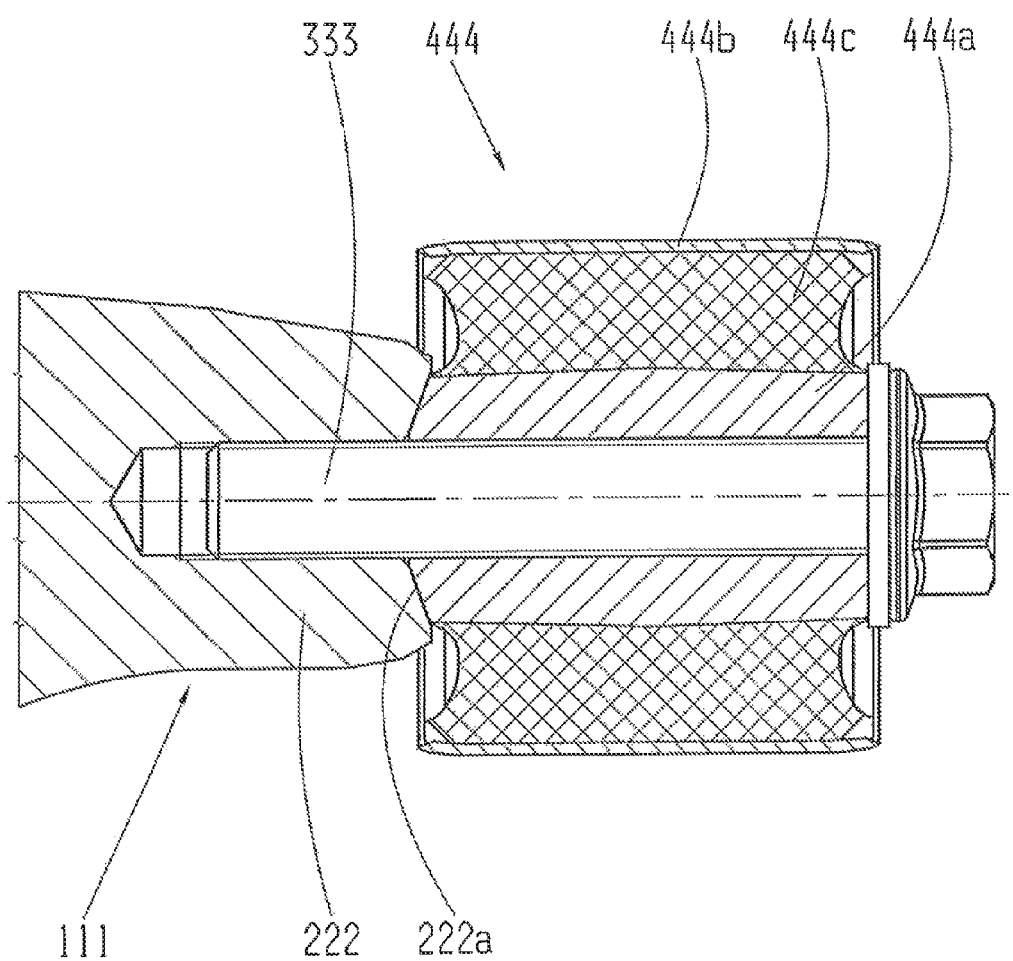
FIG. 2: A suspension arm journal and a bearing with shape interlock and a screw connection according to the prior art.
Figure 3:
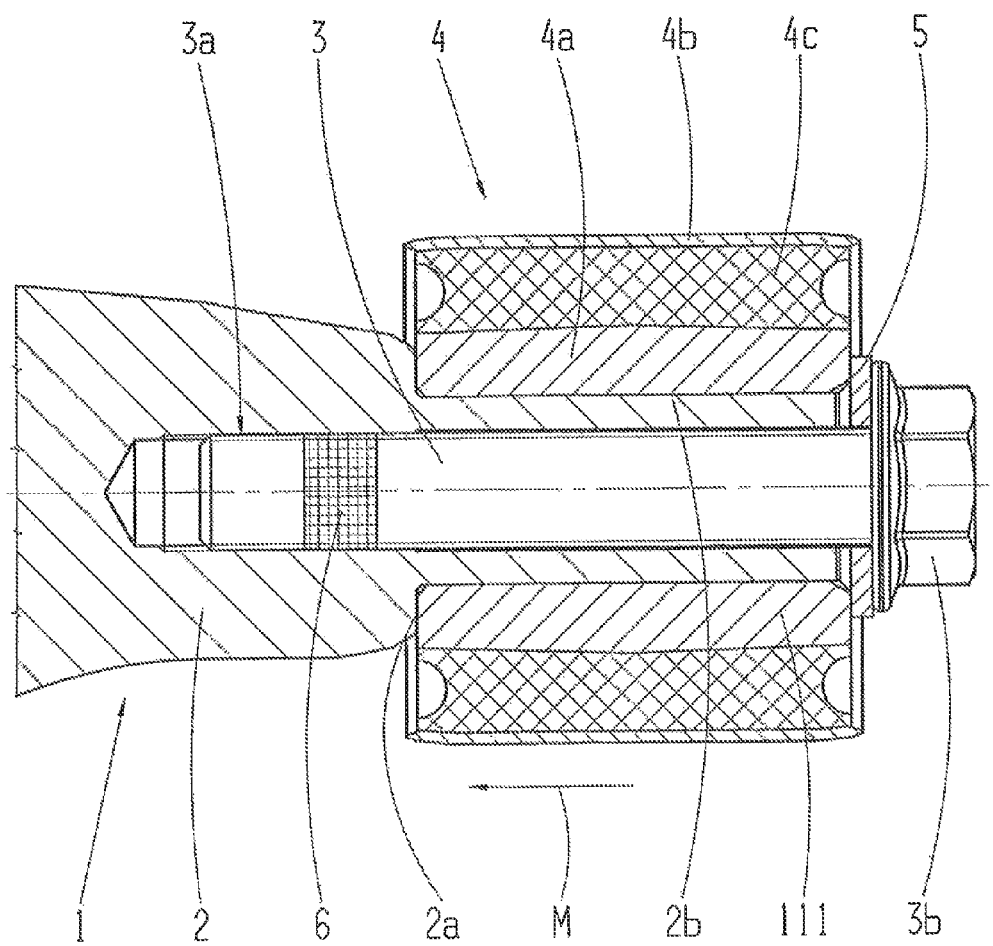
FIG. 3: A suspension arm according to the invention, with a journal and bearing paired in the manner of a transition fit and secured by a screw.

FIG. 3 shows a suspension arm 1 according to the invention with its journal 2, the journal 2 having a stepped area 2a and a contact surface 2b. In the area of the contact surface 2b of the journal 2 there is arranged a bearing 4.

The bearing 4 comprises an inner bush 4a and an outer bush 4b, and between the inner bush 4a and the outer bush 4b there is, in part, an elastomer body 4c.

The inner bush 4a is pushed on as far as the stepped area 2a of the journal 2. This stepped area 2a serves as an axial stop for the bearing 4, and simplifies assembly.

The bearing 4 and the journal 2 have a transition fit, which is to be understood as defined earlier. As regards the actual dimensions, this means that the outer diameter of the journal 2 is smaller or larger than the inside diameter of the bearing 4 or its inner bush 4a.

To secure the bearing 4 on the journal 2 a screw 3 is provided. The screw 3 is screwed in the axial direction along the longitudinal extension of the journal 2 into a bore in the journal 2, so that it is coaxial with the latter. Between a screw head 3b and the bearing 4 and journal 2 is arranged a washer 5. The washer 5 acts upon the inner bush 4a of the bearing 4, It serves to transmit the initial screwing force of the screw.

In the area 3a, i.e. in the area of the bore of the journal 2, an adhesive is provided to secure the screw 3 against loosening.

During the assembly of the bearing 4 on the journal 2, in the contact area 2b, the bearing 4 is first pushed onto the journal as far as the stepped area 2a, which can be done relatively easily thanks to the transition fit between them. Then, the adhesive 6 is applied to the thread of the screw. The screw 3, with the washer 5 fitted thereon, is then screwed into the journal 2 in the direction shown by the arrow M until the screw head 3b or the washer 5 comes in contact with the bearing 4 in the area of the inner sleeve 4a. The outer sleeve 4b of the bearing 4 is connected to some other component, for example the body of a vehicle (not shown).

Figure 4:
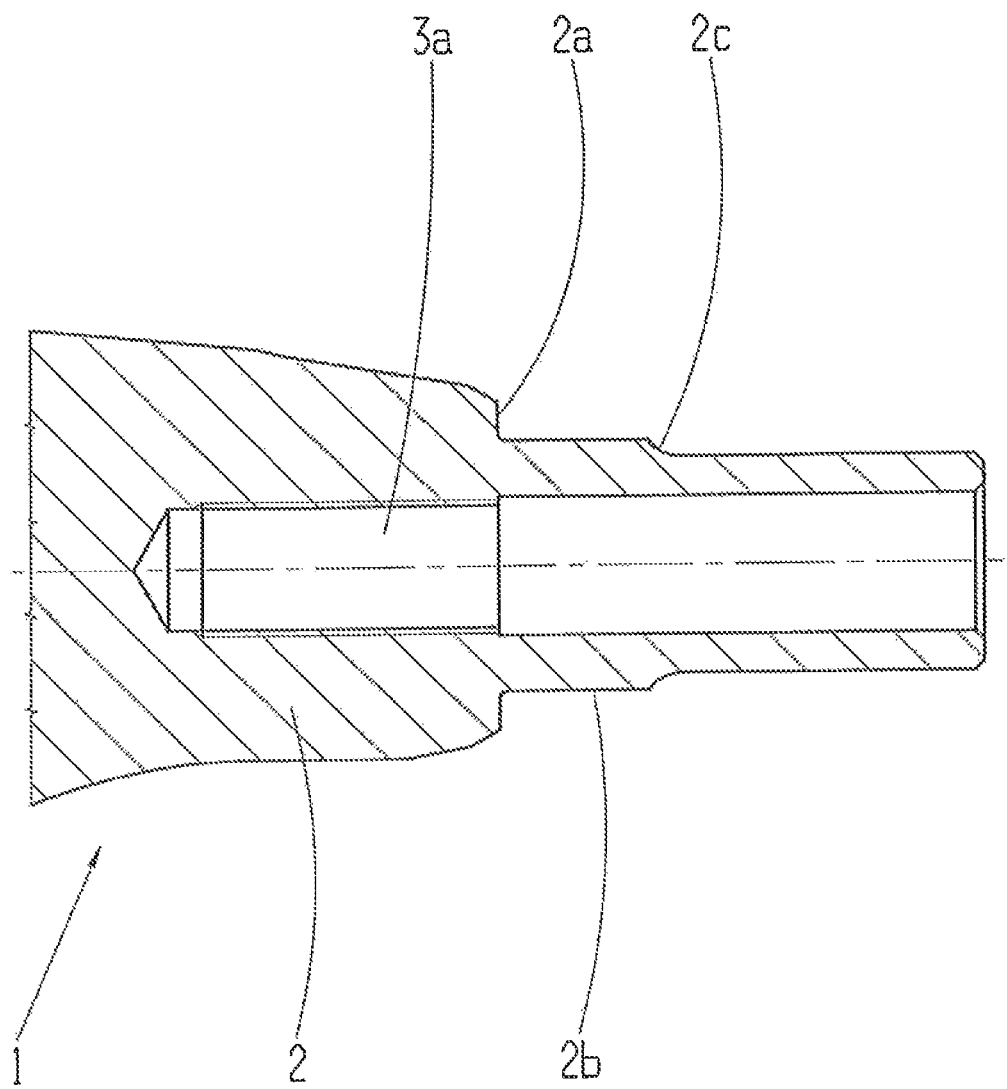
FIG. 4: An enlarged representation of a further development of the suspension arm according to the invention, with a journal as in FIG. 3 but without the bearing.

FIG. 4 shows an enlarged representation of a further development of the journal 2 in FIG. 3, but without the bearing 4. In contrast with FIG. 3, the journal 2 of the suspension arm 1 has a further stepped area 2c. As explained earlier, this reduces the contact surface 2b between the bearing 4 and the journal 2.

INDEXES

1 Suspension arm
2 Journal
2a Stepped area
2b Contact surface
2c Stepped area
3 Screw
3a Thread
3b Screw head
4 Bearing
4a Inner bush
4b Outer bush
4c Elastomer body
5 Washer
6 Adhesive
11 Suspension arm
22 Journal
22a Stepped area
22b Contact surface
44 Bearing
44a Inner bush
44b Outer bush
44c Elastomer body
111 Suspension arm
222 Journal
222a Conical shape
333 Screw
444 Bearing
444a Inner bush
444b Outer bush
444c Elastomer body
M Movement direction

The invention claimed is:

1. A suspension arm (1) for a vehicle comprising:
a bearing (4) and a journal (2);
the journal (2) having a first end and a second end, and a section of the journal (2), between the first end and a first stepped area, defining a shaft having an outer diameter;
the bearing (4) having a first end and a second end and a through bore defining an inner diameter, the inner diameter of the bore having a bore tolerance of H7 and the outer diameter of the shaft having a shaft tolerance ranging from j6 to m6, according to ISO Standard Nos. 286(–1/–2), to achieve a transition fit between the bore and the shaft which facilitates removal of the bearing (4) without damaging the journal (2) or the bearing (4);
the bearing (4) comprising at least one elastic sub-element (4c);
the bearing (4) being arranged on the journal (2) of the suspension arm (1) such that the bearing (4) is placed onto the journal (2) until the second end of the bearing abuts against the first stepped area (2a);
the bearing (4) completely enclosing the shaft such that the first end of the bearing extends beyond the first end of the journal when placed on the shaft;
the journal (2) and the bearing (4) being designed so that the bore of the bearing (4) mates with the shaft of the journal (2) continuously and uninterrupted from the first end of the journal to the first stepped area to form the transition fit and thereby facilitates exchange of the bearing without damage to the shaft; and
the bearing (4) is releasably secured to the journal (2) of the suspension arm (1) by a removable fastening element (3) having a threaded end portion to facilitate removal of the bearing (4) without damaging the journal (2) or the bearing (4).

2. The suspension arm (1) according to claim 1, wherein the journal (2) is formed integrally with a remaining portion of the suspension arm (1).

3. The suspension arm (1) according to claim 1, wherein the journal (2) and a remaining portion of the suspension arm (1) are connected to one another.

4. The suspension arm (1) according to claim 1, wherein the fastening element (3) is arranged coaxially with a longitudinal axis of the journal (2).

5. The suspension arm (1) according to claim 1, wherein the removable fastening element (3) is secured to a threaded internal bore of the journal (2) by an adhesive (6) which prevents inadvertent loosening of the removable fastening element (3), and the adhesive is located at least in an area of a thread (3a) of the removable fastening element (3).

6. The suspension arm (1) according to claim 1, wherein a washer (5) is provided between the removable fastening element (3) and the bearing (4) to transmit an initial screwing force, and the washer (5) abuts against an axial end of an inner bushing such that the inner bushing (4a) is axially fixed within the at least one elastic sub-element by the first stepped area of the journal (2) and the washer (5).

7. The suspension arm (1) according to claim 1, wherein the bearing (4) is a rubber bearing which comprises at least an inner bushing (4a), an outer bushing (4b), and an elastomer body (4c),
   the elastomer body is arranged at least in part between the inner bushing and the outer bushing,
   the inner bushing and the outer bushing are coupled with one another so that each of the inner bushing, the outer bushing and the elastomer body axially extend between the first stepped area of the journal and a head of the removable fastening element,
   and the inner bushing (4a) and the journal (2) are paired in a manner which achieves the transition fit between the inner diameter of the bore and the outer diameter of the shaft.

8. The suspension arm (1) according to claim 1, wherein the suspension arm (1) is arranged on either a front wheel axle or a rear wheel axle.

9. A suspension arm for a vehicle, the suspension arm comprising:
   a bearing having a first end and a second end and a journal having a first end;
   the journal having a threaded internal bore extending along an entire length of the journal and partially into the suspension arm;
   the bearing comprising at least one elastic sub-element;
   the journal having an outer contact surface defining a shaft with an outer diameter that is within a first tolerance range, the bearing has an inner contact surface defining a bore with an inner diameter that is within a second tolerance range;
   the bearing completely enclosing the shaft such that the first end of the bearing extends beyond the first end of the journal when placed on the shaft;
   the first and the second tolerance ranges are such that the shaft and the bore directly mate with each other by an ISO Standard transition fit according to ISO Standard Nos. 286(−1/−2) so that the tolerance facilitates removal of the bearing without damaging the bearing or the journal, and
   the bearing being releasably secured on the journal of the suspension arm by a detachable fastening element thereby facilitating, in the event of dismantling of the suspension arm, removal of the bearing, without damaging the bearing or the journal.

\* \* \* \* \*